United States Patent

[11] 3,585,304

[72] Inventor Steven M. Gray
6815 Edgewater Drive, Coral Gables, Fla. 33133

[21] Appl. No. 825,139
[22] Filed May 16, 1969
[45] Patented June 15, 1971

[54] AUTOMATIC EMERGENCY COMMUNICATION SYSTEM
34 Claims, 6 Drawing Figs.

[52] U.S. Cl. .......... 179/5
[51] Int. Cl. .......... H04m 11/04
[50] Field of Search .......... 179/5, 2 A, 5 P, 100 L

[56] References Cited
UNITED STATES PATENTS

| | | | |
|---|---|---|---|
| 2,726,377 | 12/1955 | Hammer | 179/2 (A) |
| 3,427,401 | 2/1969 | Waddell | 179/5 (P) |
| 3,427,402 | 2/1969 | Stokes | 179/5 (P) |
| 3,437,759 | 4/1969 | McKinzie | 179/5 |

*Primary Examiner*—Kathleen H. Claffy
*Assistant Examiner*—David L. Stewart
*Attorney*—Anthony A. O'Brien

ABSTRACT: An automatic emergency communication system including a central control station connected with a plurality of subscriber stations through a conventional telephone system. Each of the subscriber stations includes an actuator responsive to a predetermined condition for energizing a tape deck to supply signals corresponding to the telephone number of the central control station to a telephone line and to supply a message to the telephone line, and circuitry responsive to control signals from the central control station to place the subscriber stations in a transmit mode whereby sounds at the subscriber stations are transmitted to the central control station and a receive mode whereby messages from the central control station are received by the subscriber stations.

INVENTOR,
Steven M. Gray
BY Anthony A. O'Brien
ATTORNEY

INVENTOR,
Steven M. Gray
BY Anthony A. O'Brien
ATTORNEY

INVENTOR,
Steven M. Gray
BY Anthony A. O'Brien
ATTORNEY

INVENTOR,
Steven M. Gray
BY Anthony A. O'Brien
ATTORNEY

AUTOMATIC EMERGENCY COMMUNICATION SYSTEM

BACKGROUND OF THE INVENTION

1. Field of the Invention

The present invention pertains to communication systems and more particularly to automatic emergency communication systems utilizing conventional public telephone systems.

2. Description of the Prior Art

Communication systems have been designed in the past to utilize existing telephone systems for automatic emergency communication; however, these systems have not provided the completely automatic and reliable communication necessary and further have not provided the complete service required to determine the validity and/or specific nature of an emergency call.

Due to the nature of these systems it is common for a message to be transmitted from a subscriber station indicating a condition that does not exist due to the accidental and/or faulty actuation of condition sensing means. Further, when manual actuators are utilized many times a message will be sent by a person at a subscriber station due to the existence of suspicious circumstances that may or may not develop into actual emergencies. Conventional communication systems receive messages actuated in response to suspicious circumstances without any indication that an actual emergency does not exist and arrange for remedial action for "false alarms". Such operation is highly undesirable from an economic standpoint due to the waste of manpower in sending either police, firemen, custodians or other personnel having the ability to cope with the alarm condition to the subscriber, and further is highly disadvantageous in that the telephone lines and the attention of an operator at either a central control station or at a police or fire station or the like are unduly tied up.

In attempting to overcome the above mentioned problems, communication systems designed in the past have become unduly complex thereby providing greater opportunity for faulty operation which is highly undesirable in that reliable operation is a primary requirement for emergency communication systems. Furthermore, complex systems raise the cost of installation and equipment and correspondingly reduce the market.

Since communication systems of this type utilize conventional existing telephone systems, it is desirable to make them available on a cost basis to all who desire such protection. Since a great majority of the population has telephones in their homes, these communication systems are readily adaptable to accommodate the special considerations existing at almost every potential user. That is, an alarm may be transmitted in response to such conditions as fire, theft, inoperative equipment, and environmental conditions among others. However, in order to fully develop the potential market for such communication systems, the units to be installed at the subscriber stations must be relatively inexpensive; and, in the past, attempts to provide such communication systems have been unsuccessful in taking full a advantage of the available market.

It has been found to be advantageous to record signals corresponding to telephone numbers in tone bursts due to the ease of recording. Normally single track tapes are used for recording with the telephone number tone bursts followed by a message. A problem then arises because the circuitry required to apply the tone bursts and the message to a telephone line differs. Attempts to solve this problem in the past have included providing indicia on the tape, such as metallic strips, to indicate the placement of the tone bursts and the message. Switch means are provided responsive to the indicia to connect the various circuitry required to one or more tape heads to supply the tone bursts and message to the telephone line. This method requires extremely complex and precise switching and timing circuitry to assure that the proper circuitry is connected for both the telephone number and message signals and accordingly has not been successful.

In order to provide a system with integrity, provision must be made to assure proper placing of a call, automatic answering, replacing the call when there is no answer and complete control of the subscriber stations from the control control station. Prior systems have failed to provide the above features and thus have not been successful. Specifically, systems that communicate conditions directly to governmental agencies such as police stations and fire stations are hampered by the requirement that the telephone lines not be tied up. That is, continuous replacing of a call until it is answered at a police station or fire station, that must be open to receive other emergency calls, is undesirable.

SUMMARY OF THE INVENTION

Accordingly it is an object of the present invention to communicate the existence of conditions at a subscriber station to a central control station through a telephone system.

Another object of the present invention is to control the mode of operation of a subscriber station in response to mode signals from a central control station.

A further object of the present invention is to provide a communication system having a central control station and a plurality of subscriber stations, the subscriber stations having a transmit mode whereby sounds detected thereat may be transmitted to the central control station and a receive mode whereby messages from the central control station may be audibly reproduced at the subscriber stations.

The present invention has another object in that a central control station is capable of monitoring a subscriber station after a condition at the subscriber station has been communicated to the central control station.

Another object of the present invention is to utilize dual track tape in a communication system utilizing a telephone system wherein a first track of the tape includes information signals corresponding to a message and a second track of the tape includes information signals corresponding to the telephone number of a central control station.

A further object of the present invention is to store a busy signal at the start of a tape for use with a subscriber station in a communication system utilizing a telephone system wherein the busy signal operates as an alarm to warn those using the telephone to hang up.

Another object of the present invention is to provide a hangup signal at the end of a tape for use with a subscriber station in a communication system utilizing a telephone system wherein the hangup signal disconnects the subscriber station if no prior acknowledgment of a call is received from a central control station.

The present invention is advantageous over prior communication systems in that telephone number signals and message signals are recorded on the same tape without the use of additional switching or timing circuitry at the subscriber station, that the central control station may be recalled by the subscriber stations any number of times, that an operator at number of times, that an operator at the central control station may monitor a calling subscriber station, that an operator at the central control station may transmit a message to the calling subscriber station and that the mode of operation of a subscriber station may be controlled from the central control station.

The present invention is generally characterized in an automatic emergency communication system utilizing a telephone system to place a telephone call to a central control station from a subscriber station upon the occurrence of a predetermined condition. The central control station includes a first telephone line connected with the telephone system and mode signal generating means for supplying mode signals to the subscriber station through the first telephone line and the telephone system. The subscriber station includes a second telephone line connected with the telephone system, recording means storing the telephone number of the central control station, first circuit means supplying the telephone number to the second telephone line upon the occurrence of a predetermined condition, transducer means, second circuit means connecting the transducer means with the second telephone line and control means receiving mode signals from the central control station to place the second circuit means in a first arrangement wherein the subscriber station is in a transmit mode of operation and in a second arrangement wherein the subscriber station is in a receive mode of operation.

Further objects and advantages of the present invention will become apparent from the description of the preferred embodiment as shown in the accompanying drawings.

DESCRIPTION OF THE PREFERRED EMBODIMENT

Figure 1:
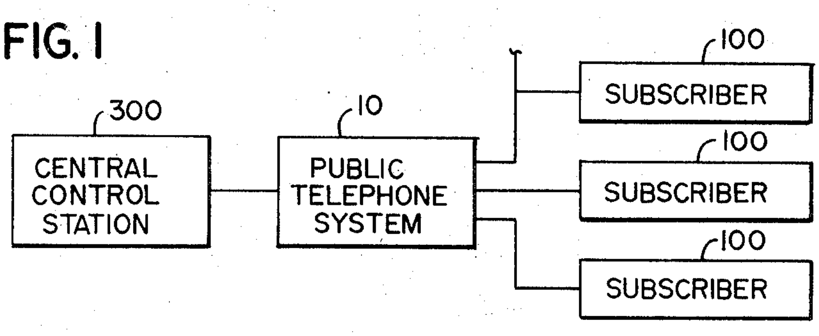
FIG. 1 is a block diagram of the automatic emergency communication system of the present invention.

A block diagram of the automatic emergency communication system of the present invention is illustrated in FIG. 1. A plurality of subscriber stations 100 are connected through a conventional public telephone system 10 to a central control station 300 such that a subscriber station 100 may call central control station 300 upon the occurrence of a predetermined condition at the subscriber station. While only three subscriber stations 100 are shown in FIG. 1, it is clear that any number of subscriber stations may be utilized with a single central control station. Of course, the central control station may have as many telephone numbers as are required by the number of subscriber stations in the system.

The circuitry at each subscriber station 100 is substantially identical to permit modular production thereof with the possible exception of condition sensing means. The conditions that may be sensed in order to cause a subscriber station 100 to call central control station 300 are manifold. As examples, conditions such as fire, movement of objects or persons, temperature, pressure, humidity, or flow may be utilized to actuate subscriber stations 100. Actuators for sensing the conditions may include such devices as thermocouples, heat or flame sensitive solid state components, photo cells, capacitive bridges or wires arranged around doors or windows of an enclosure. Any actuator may be utilized to sense conditions with the requirement that the actuator must be capable of closing a pair of alarm contacts either directly or through intermediate circuitry. Of course, the alarm contacts may be closed by manual actuation of a pushbutton switch or the like.

In general the operation of the automatic emergency communication system is such that once a predetermined condition is sensed at a subscriber station 100, the subscriber station generates signals corresponding to the telephone number of central control station 300 and transmits an audio message to central control station 300 identifying the calling subscriber station 100 and requesting an acknowledgment of the call. The subscriber station continues to call central control station 300 until the call is acknowledged. The call is acknowledged by an operator at central control station 300 by generating mode signals to place the calling subscriber station 100 in a transmit mode of operation or a receive mode of operation. In the transmit mode of operation the calling subscriber station 100 is monitored by central control station 300 such that sounds at the calling subscriber station 100 are transmitted to central control station 300. In the receive mode of operation, audio messages from the central control station are received by the calling subscriber station 100 where they are audibly reproduced.

The above general description of the operation of the automatic emergency communication system has been provided to facilitate understanding of the subscriber and central control stations as illustrated in detail in FIGS. 2 and 5 and described hereinafter, and to point out the many uses of the present invention such as to detect fires and unauthorized entry into protected areas and to provide alarm indications for use with equipment control, process control or environmental control systems.

Figure 2:
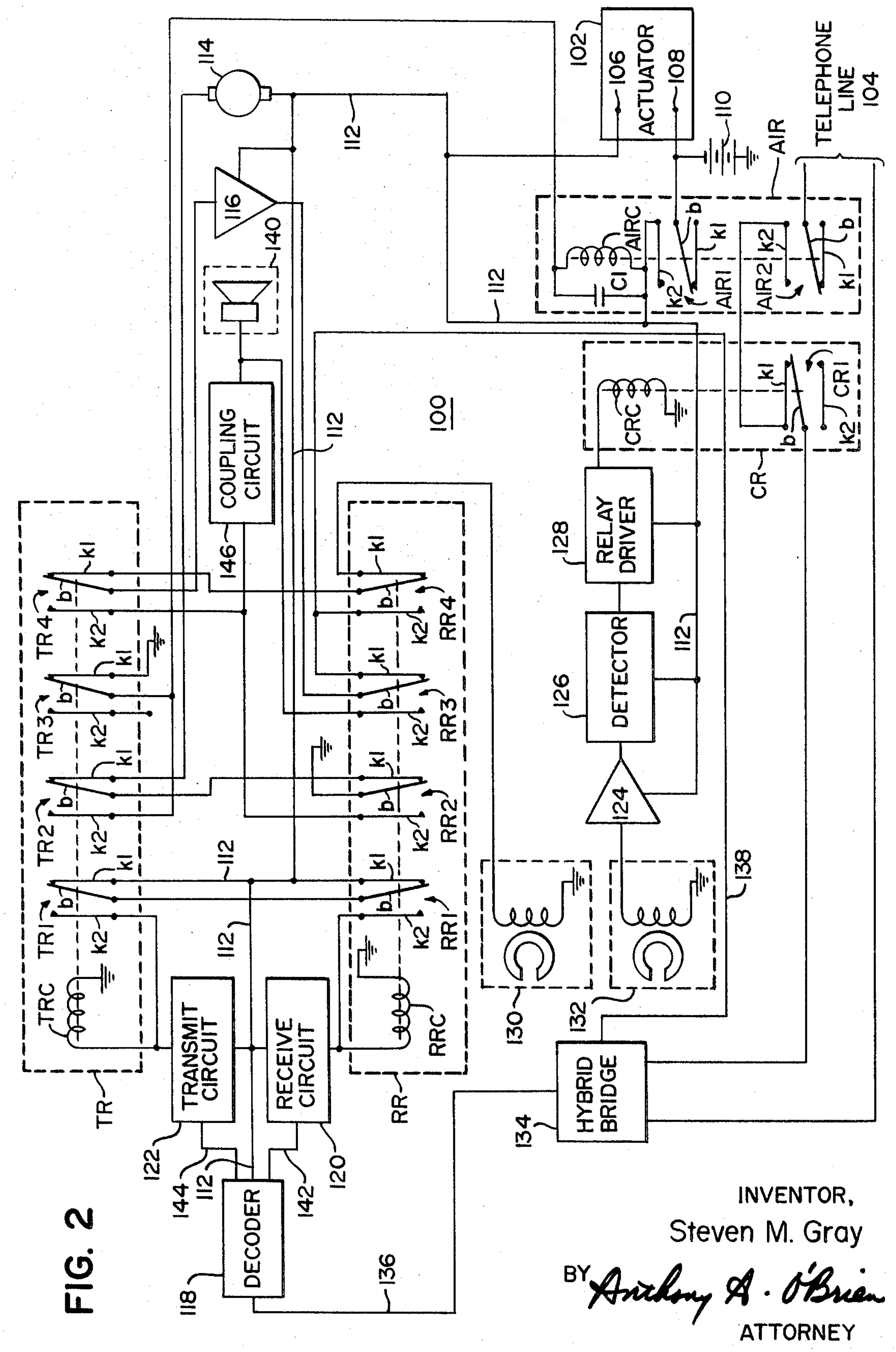
FIG. 2 is a schematic diagram of a subscriber station of the system of FIG. 1.
Figure 5:
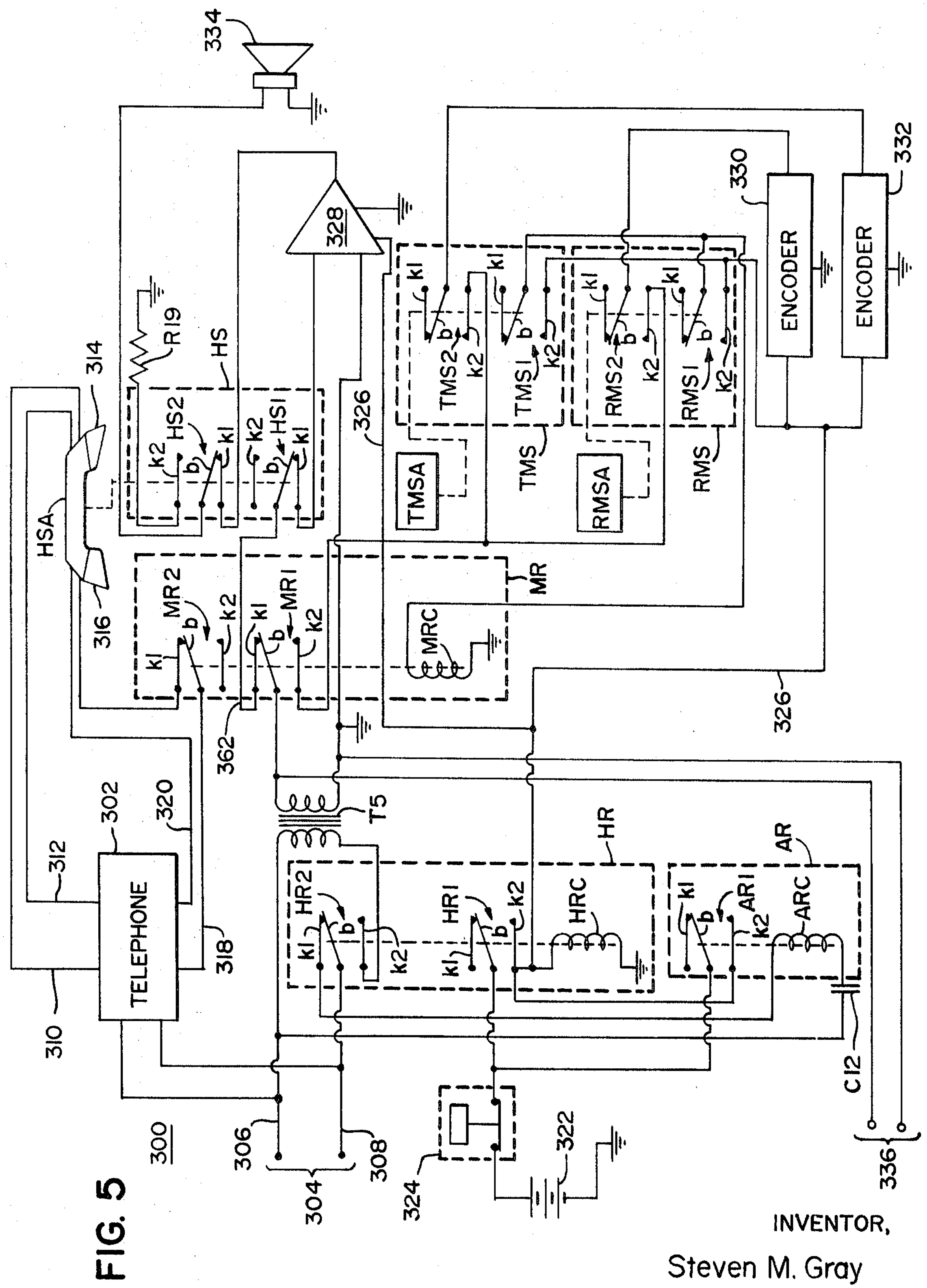
FIG. 5 is a schematic diagram of the central control station of the system of FIG. 1.

The relays and manual switching circuits illustrated in FIGS. 2 and 5 are designated by reference letters as follows:

| | |
|---|---|
| AIR | Alarm initiation relay |
| CR | Calling relay |
| RR | Receive relay |
| TR | Transmit relay |
| MR | Muting relay |
| HR | Holding relay |
| AR | Answering relay |
| HS | Handset switching circuit |
| TMS | Transmit mode switching circuit |
| RMS | Receive mode switching circuit |

The switches included in each relay and manual switching circuit are designated by the reference letters of the relay or switching circuit along with a reference number from 1 to 4. Similarly, the coil of each relay is designated by the reference letters of the relay with a C appended thereto, and the actuator for each switching circuit is designated by the reference letters of the switching circuit with an A appended thereto.

All of the switches in the relays and switching circuits are single-pole, double-throw switches having a movable blade *b* and a pair of contacts *k*1 and *k*2. All of the relays are illustrated in their deenergized states, and all of the switching circuits are illustrated in their deactuated states; that is, with blade *b* of each switch connected with contact *k*1.

SUBSCRIBER STATION

One of the subscriber stations 100 of FIG. 1 is illustrated in detail in FIG. 2 and includes a condition responsive actuator 102 for initiating operation of such subscriber station 100 to call central control station 300 (FIG. 1) through a telephone line 104 by closing a pair of alarm contacts 106 and 108. An alarm initiation relay AIR has a first switch AIR1 connected with alarm contact 108 and the negative terminal of a DC source 110 that has its positive terminal grounded. A second switch AIR2 is connected with telephone line 104 to control the opening and closing thereof. A capacitor C1 is shunted across the coil AIRC of relay AIR in order to provide a holding characteristic for relay AIR as will be described hereinafter. Switch AIR1 is also connected with coil AIRC to latch relay AIR in its energized state.

A negative bus 112 supplies negative operating potential from source 110 to a tape deck motor 114, an amplifier 116, a receive relay RR, a transmit relay TR, a decoder 118, an integrating and amplifying receive circuit 120, an integrating and amplifying transmit circuit 122, an amplifier 124, a detector 126 and a relay driver 128 when relay AIR is energized to connect the negative terminal of source 110 to bus 112 through switch AIR1.

Tape deck motor 114 is a component of a conventional dual track tape deck which also includes amplifier 116, a read head 130 and a read head 132. Read head 130 is adapted to pick up signals corresponding to a busy signal and a message from a first track of a magnetic tape, and a read head 132 is adapted to pick up signals corresponding to a telephone number and a hangup signal from a second track of the tape, as will be described in more detail hereinafter.

The signals picked up by read head 132 are supplied to the coil CRC of a calling relay CR through amplifier 124, detector 126 and relay driver 128. Switch CR1 of relay CR is connected with telephone line 104 such that the opening and closing of switch CR1 provides pulses to public telephone system 10.

Figure 3:
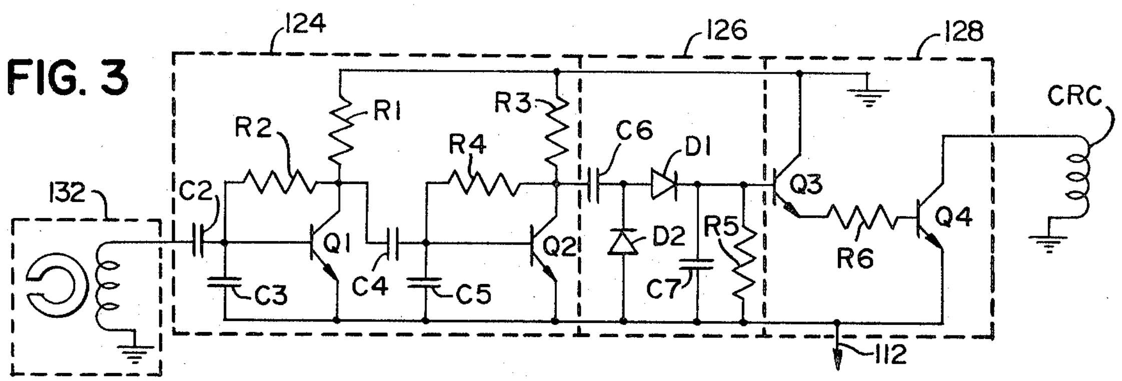
FIG. 3 is a schematic diagram of the amplifier, detector and relay driver of FIG. 2.

While any conventional circuitry may be utilized to control the operation of relay CR in accordance with the recorded telephone number signals, circuitry according to the preferred embodiment is illustrated in FIG. 3 in order to operate on telephone number and hangup signals which are recorded on the second track of the tape as tone bursts to facilitate recording and pick up.

Amplifier 124 is comprised of two AC coupled transistor stages. The first stage includes an NPN transistor Q1 having its emitter connected directly to negative bus 112 and its collector grounded through a resistor R1. Negative feedback from collector to base is provided through a resistor R2. A coupling capacitor C2 supplies the tone bursts from read head 132 to the base of transistor Q1 which base is coupled to negative bus 112 through a capacitor C3. The second stage includes an NPN transistor Q2 having its base coupled to the collector of transistor Q1 through a capacitor C4 and coupled to negative bus 112 through a capacitor C5. The emitter of transistor Q2 is connected directly to negative bus 112, and the collector of transistor Q2 is grounded through a resistor R3 and is connected to provide negative feedback to the base through a resistor R4. Amplifier 124 operates to amplify the telephone number and hangup tone burst signals and apply the signals to detector 126.

Detector 126 includes a capacitor C6 connected with the collector of transistor Q2 and the anode of a detector diode D1. A diode D2 has its cathode connected with the anode of diode D1 and its anode connected to negative bus 112. The cathode of detector diode D1 is connected with a detector-filter circuit including the parallel combination of a capacitor C7 and a resistor R5. Detector 126 operates to detect the envelope of the tone bursts and provide pulses corresponding to the envelope of the tone bursts to relay driver 128.

Relay driver 128 includes an NPN transistor Q3 having its base connected to receive the output from detector 126, its collector grounded, and its emitter connected through a resistor R6 to the base of an NPN transistor Q4. The collector of transistor Q4 is connected to ground through coil CRC of relay CR, and the emitter of transistor Q4 is connected directly to negative bus 112. Thus, the tone bursts picked up by read head 132 are amplified, detected and utilized to drive transistor Q4 to energize and deenergize relay CR in accordance with the recorded telephone number and hangup signals.

Referring again to FIG. 2, telephone line 104 is connected with a hybrid bridge 134 which has an output lead 136 connected with decoder 118. An input-output lead 138 from hybrid bridge 134 is connected with switches RR3 and RR4 of relay RR.

Audio messages from central control station 300 are received by hybrid bridge 134 through telephone line 104 and supplied to a transducer 140, such as a combination speaker-microphone, through switch RR4 when relay RR is energized, switch TR4 when relay TR is deenergized, amplifier 116 and switch RR3.

Mode signals from central control station 300 are received by hybrid bridge 134 through telephone line 104 and are supplied to decoder 118 through output lead 136. The mode signals are signals of precise, audio frequencies which are detected by decoder 118 to supply a signal to either or both of receive circuit 120 and transmit circuit 122 over output leads 142 and 144, respectively. Receive circuit 120 and transmit circuit 122 operate to energize relay RR and relay TR, respectively, upon receiving a signal from decoder 118.

Figure 4:
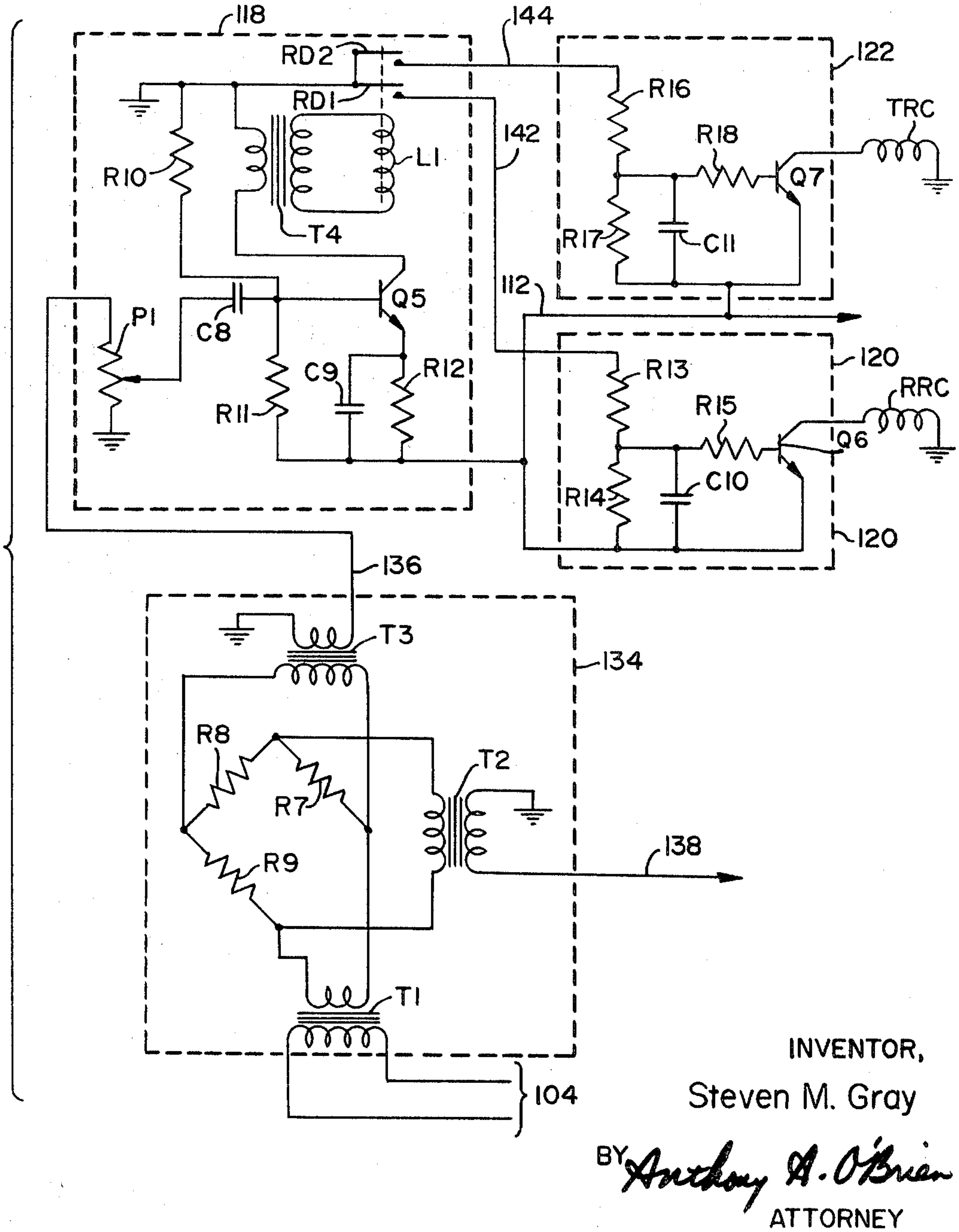
FIG. 4 is a schematic diagram of the hybrid bridge, decoder, and transmit and receive circuits of FIG. 2.

While any conventional circuitry can be utilized to decode the mode signals and selectively energize relays RR and TR in accordance with the mode signals, a preferred circuit is illustrated in FIG. 4 which includes an example of a hybrid bridge for use with the present invention.

Hybrid bridge 134 includes a transformer T1 having a first winding connected across and impedance matched with telephone line 104 and a second winding connected as one leg of a bridge having resistors R7, R8 and R9 in the other three legs. A first winding of a transformer T2 is connected across the bridge at the junction of resistors R7 and R8 and the junction of resistor R9 and the second winding of transformer T1. One side of a second winding of transformer T2 is grounded and the other side is connected with input-output lead 138. A transformer T3 has a first winding connected across the bridge at the junction between resistors R8 and R9 and the junction between the second winding of transformer T1 and resistor R7. A second winding of transformer T3 has a first side grounded and a second side connected with output lead 136.

The mode signals from hybrid bridge 134 on output lead 136 are received by decoder 118 at a potentiometer P1. The mode signals are picked off potentiometer P1 at a slide and coupled through a capacitor C8 to the base of an NPN transistor Q5. The base of transistor Q5 is connected to the junction between two resistors R10 and R11 which are connected in series between ground and negative bus 112. The emitter of transistor Q5 is coupled to negative bus 112 through a parallel combination of a capacitor C9 and a resistor R12. The collector of transistor Q5 is connected to ground through a first winding of a transformer T4 which has a second winding connected across a field coil L1. Field coil L1 is adapted to control the operation of a pair of resonant reeds RD1 and RD2 which are illustrated schematically. The specific structure of a resonant reed decoder which may be utilized with the present invention may be found on pages 4, 5 and 6 of a booklet entitled "Control Techniques With Resonant Reed Relays," Aug., 1964, By the Bramco Controls Division, Ledex, Inc. Piqua, Ohio. The resonant reeds RD1 and RD2 are each turned to precise frequencies corresponding to mode signal frequencies such that the corresponding resonant reeds are operated by the mode signals received from central control station 300 and amplified by transistor Q5.

When resonant reed RD1 is operated, an output signal is applied to receive circuit 120 on lead 142 through series connected resistors R13 and R14. The signal is integrated by a capacitor C10 in shunt with resistor R14, and the integrated signal from capacitor C10 is applied to the base of an NPN transistor Q6 through a current limiting resistor R15. The emitter of transistor Q6 is connected directly to negative bus 112 and the collector is connected to ground through coil RRC of relay RR. Thus, when resonant reed RD1 is operated in response to a mode signal, transistor Q6 is rendered conducting to energize relay RR.

The structure of transmit circuit 122 is similar to receive circuit 120, and operation of resonant reed RD2 applies an output signal across an integrating capacitor C11 through a pair of series resistors R16 and R17. The integrated signal from capacitor C11 is applied to the base of a transistor Q7 through a current limiting resistor R18. The emitter of transistor Q7 is connected directly to negative bus 112, and the collector of transistor Q7 is connected to ground through coil TRC of relay TR such that operation of resonant reed RD2 energizes relay TR.

Sounds from subscriber stations 100 are transmitted to central control station 300 through telephone line 104 when transducer 140 is operated in its microphonic mode by supplying signals from transducer 140 to hybrid bridge 134 through a coupling circuit 146, switch TR4 when relay TR is energized, amplifier 116, switch RR3 when relay RR is deenergized and input-output lead 138. Coupling circuit 146 may include a step up transformer and a potentiometer to control the amplitude of transmitted sounds. Similarly, a compression amplifier may be utilized in place of amplifier 116 to assure that the amplitude of the sound signals is within telephone system standards.

CENTRAL CONTROL STATION

Central control station 300 is illustrated in FIG. 5 and includes conventional commercial telephone apparatus 302 connected across a telephone line 304 comprising wires 306 and 308 which are adapted to be connected through public telephone system 10 to telephone line 104 at the subscriber stations 100. A pair of leads 310 and 312 are connected from telephone apparatus 302 to a receiver or earpiece 314 of a handset HSA, and a microphone or mouthpiece 316 of handset HSA is connected with telephone apparatus 302 by a pair of leads 318 and 320 through a switch MR2 of a muting relay MR. Physical movement of handset HSA controls the state of a manual switching circuit HS.

An answering relay AR responsive to ringing current from telephone system 10 has a coil ARC connected across telephone line 304 through a blocking capacitor C12 and a switch HR2 of a holding relay HR. When central control station 300 receives a ringing signal, relay AR is energized, and holding relay HR is energized through switch AR1. A DC source 322 has its negative terminal connected to ground and its positive terminal connected through normally closed push button switch 324 to switch AR1; and, when relay HR is energized, the potential from source 322 is applied to a positive bus 326 to supply operating potential to an amplifier 328, a receive encoder generator 330 and a transmit encoder generator 332.

Once relay HR is energized switch HR2 disconnects coil ARC from the telephone line circuit thereby deenergizing relay AR. Relay HR is latched in its energized state through switch HR1. A first winding of a transformer T5 is impedance matched with telephone line 304 and is connected with telephone line 304 through switch HR2 when relay HR is energized. A second winding of transformer T5 has one side grounded and the other side connected through a switch MR1 when muting relay MR is deenergized and a switch HS1 of switching circuit HS when it is deactuated as an input to amplifier 328. The output of amplifier 328 is connected through a switch HS2 of switching circuit HS when it is deactuated to a speaker 334.

A transmit mode switching circuit TMS responsive to the actuation of a transmit mode actuator TMSA has a switch TMS1 adapted to connect coil MRC of relay MR with positive bus 326 when switching circuit TMS is actuated. A switch TMS2 is adapted, when switching circuit TMS is actuated, to connect transmit encoder generator 332 to transformer T5 through switch MR1 when relay MR is energized.

A receive mode switching circuit RMS responsive to the actuation of a receive mode actuator RMSA has a switch RMS1 adapted to connect coil MRC of relay MR with positive bus 326 when switching circuit RMS is actuated. A switch RMS2 is adapted, when switching circuit RMS is actuated, to connect receive encoder generator 330 to transformer T5 through switch MR1 when relay MR is energized.

Encoder generators 330 and 332 provide precise, stable, audiofrequency outputs of 690 Hz. and 780 Hz., respectively. An example of encoder generator circuitry that may be utilized for both encoder generators 330 and 332 is specifically described on page 7 of a booklet entitled "Control Techniques with Resonant Reed Relays," Aug., 1964, by the Bramco Controls Division, Ledex, Inc. Piqua, Ohio. Encoder generators 330 and 332 are operative to provide outputs once the positive potential from source 322 is applied to positive bus 326 by energization of relay HR.

A pair of recording leads 336 are connected across the second winding of transformer T5 and are adapted to be connected to any conventional recording apparatus for providing a permanent record of communications received and transmitted by central control station 300.

OPERATION

Figure 6:
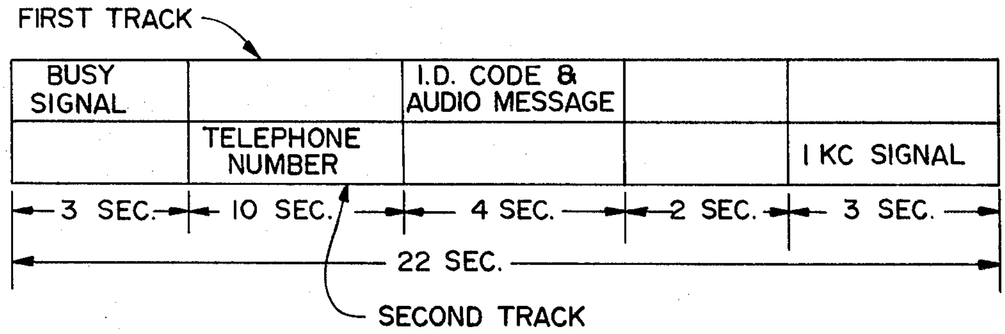
FIG. 6 is a chart illustrating the information recorded on the dual track tape utilized at the subscriber stations.

The operation of the automatic emergency communication system will be described with the aid of FIG. 6 which is a chart illustrating the signals stored on the dual track magnetic tape utilized with the tape deck. Time is illustrated in the chart of FIG. 6 from left to right. The tape is looped so that the tape repeats itself, and a full cycle has a playing time of approximately 22 seconds.

Once motor 114 of the tape deck is energized the first track of the tape generates a tone or busy signal for three seconds. Following the busy signal the second track of the tape generates a series of tone bursts spaced to conform to the standards of public telephone system 10 and corresponding to the telephone number of central control station 300. The calling operation takes approximately 10 seconds. Following the calling of central control station 300, the first track generates an audio message signal for 4 seconds identifying the calling subscriber station 100 and requesting acknowledgment of receipt of the message. There follows a period of 2 seconds with no signal on either track of the tape; and, thereafter, a 3-second, 1KC hangup signal is generated by the second track to disconnect the calling subscriber station 100. The utilization of the information signals on the dual track tape will be explained with the overall operation of the system hereinafter.

In the normal state when no conditions exist to close alarm contacts 106 and 108, the subscriber stations 100 are passive. That is, the negative operating potential from source 110 is not supplied to the subscriber circuitry due to the deenergized state of relay AIR which maintains blade *b* of switch AIR1 in contact with unconnected contact *k*1. The deenergized state of relay AIR maintains telephone line 104 open since blade *b* of switch AIR2 contacts unconnected contact *k*1.

In the normal inactive state when central control station 300 has not been called by a subscriber station 100, central control station 300 is in a passive state with positive operating potential from source 322 not applied to positive bus 326 due to blade *b* of switch HR1 contacting unconnected contact *k*1. Coil ARC and series capacitor C12 are connected across wires 306 and 308 of telephone line 304 due to the contact of blade *b* of switch HR2 with contact *k*1 in order to detect the ringing current generated by public telephone system 10 when central control station 300 is called. The first winding of transformer T5 is disconnected from telephone line 304 due to the contact of blade *b* of switch HR2 with contact *k*1 when relay HR is deenergized. Relay HR is energized only after relay AR is energized. Thus, when central control station 300 is in the passive state, coil ARC is connected across telephone line 304 to receive a ringing signal, and transformer T2 is disconnected from telephone line 304.

The operating potential at subscriber stations 100 and central control station 300 from sources 110 and 322 are isolated from negative bus 112 and positive bus 326, respectively, such that there is no power drain at either the subscriber or central control stations when they are not in use. Accordingly, all relays and manual switching circuits are in their deenergized and deactuated states, respectively, when the subscriber and central control stations are not in use.

When a predetermined condition occurs at a subscriber station 100 actuator 102 is automatically or manually actuated to close or short alarm contacts 106 and 108 to provide a current path from the negative terminal or source 110 through coil AIRC to ground through blade *b* and contact *k*1 of switch TR3. The current through coil AIRC energizes relay AIR, and a holding current path is completed from the negative terminal of source 110 through blade *b* and contact *k*2 of switch AIR1 and coil AIRC to ground through switch TR3 to latch relay AIR in its energized state. Thus, only momentary closing of alarm contacts 106 and 108 is necessary to initiate operation of subscriber stations 100.

Negative bus 112 is provided with negative potential from source 110 through blade *b* and contact *k*2 of switch AIR1 to provide operating potential for the subscriber station circuitry to permit the calling of central control station 300 and the transmitting of a message.

Tape deck motor 114 is energized by current flowing from negative bus 112 through the motor, contact *k*1 and blade *b* of switch TR2 and contact *k*1 and blade *b* of switch RR2 to ground. Thus, operation of tape deck motor 114 requires both relay TR and RR to be deenergized, and tape deck motor 114 may be stopped by the energization of either or both or relays TR and RR. Operation of tape deck motor 114 drives the dual track tape past read head 130 and read head 132. The first signal generated by the tape deck is the 3-second busy signal on the first track of the tape which is picked up by read head 130 and supplied to telephone line 104 through contact *k*1 and blade *b* of switch RR4, contact *k*1 and blade *b* of switch TR4, amplifier 116, blade *b* and contact *k*1 of switch RR3, input-output lead 138 and hybrid bridge 134. When relay CR is deenergized and relay AIR is energized, telephone line 104 is closed through switches CR1 and AIR2, and the 3-second busy signal provides an audible warning to any person utilizing a telephone extension at the calling subscriber station 100 to clear the line for use in calling central control station 300. The 3-second busy signal also permits sufficient time after the closing of telephone line 104 through switch AIR2 to obtain a dial tone prior to placing the call. 3-second busy signal is followed by the 10-second period of tone burst signals corresponding to the telephone number of central control station 300. As previously described, the tone bursts are picked up by read head 132 and amplified at amplifier 124. The envelope of the tone bursts is detected by detector 126 and supplied to relay driver 128 to selectively control the energization of relay CR. Each pulse of the envelope serves to energize relay CR and open or break telephone line 104 through the contacting of blade *b* of switch CR1 with unconnected contact *k*2. Pulses corresponding to the telephone number of central control station 300 are thus applied to telephone line 104 to automatically call central control station 300.

The pulses are detected by public telephone system 10, and a ringing signal is supplied to central control station 300 by the telephone system. Coil ARC is connect across telephone line 304 through contact *k*1 and blade *b* of switch HR2, and relay AR is energized in response to the ringing signal. Energization of relay AR completes a current path from source 322 through switch 324, blade *b* and contact *k*2 of switch AR1 and coil HRC to energize relay HR. Contact of blade *b* of switch HR1 with contact *k*2 latches relay HR in its energized state and supplied positive potential from source 322 to positive bus 326. Encoder generators 330 and 332 are operated by the positive potential from source 322 on positive bus 326 and continuously provides the stable, precise frequency outputs of 690 Hz. and 780 Hz., respectively, as long as positive bus 326 has operating potential thereon.

The energization of relay HR removes relay AR from telephone line 304 by opening contact *k*1 and blade *b* of switch HR2 and connects impedance matching and coupling transformer T5 across telephone line 304 due to the contact of blade *b* of switch HR2 with contact *k*2. Central control station 300 is now in condition to receive the audio message generated by the calling subscriber station 100.

At the calling subscriber station 100, the audio message is picked up by read head 130 and supplied to telephone line 104 through contact *k*1 and blade *b* of switch RR4, contact *k*1 and blade *b* of switch TR4, amplifier 116, blade *b* and contact *k*1 of switch RR3, input-output lead 138 and hybrid bridge 134.

The message is supplied from telephone line 304 at central control station 300 to speaker 334 through transformer T5, blade *b* and contact *k*1 of switch MR1, blade *b* and contact *k*1 of switch HS1, amplifier 328, and contact *k*1 and blade *b* of switch HS2. Thus, calls placed by the subscriber station 100 are automatically answered by central control station 300, and the audio message identifying the calling subscriber station 100 and requesting acknowledgement of the call is audibly reproduces at central control station 300 through speaker 334 automatically without the necessity of the operator answering the call.

Once the message is received at central control station 300 the operator may acknowledge the call by depressing either actuator TMSA or actuator RMSA. The acknowledgement of the call must be completed prior to the generation of the 1KC hangup signal which disconnects the calling subscriber station 100. It has been found that the 2-second period between the message and the hangup signal is sufficient to permit the operator at central control station 300 to complete acknowledgment of the call.

When actuator TMSA is depressed, switching circuit TMS is actuated to supply the positive potential on positive bus 326 to coil MRC through contact *k*2 and blade *b* of switch TMS1 to energize relay MR. Since transmit encoder generator 332 is continuously operating, the 780 Hz. transmit mode signal output of encoder generator 332 is communicated to the calling subscriber station 100 through blade *b* and contact *k*2 of switch TMS2, contact *k*2 and blade *b* of switch MR1, transformer T5, telephone line 304 and public telephone system 10.

The transmit mode signal is received at the calling subscriber station 100 on telephone line 104 and supplied to decoder 118 through hybrid bridge 134, as previously described. Relay TR is energized by transmit circuit 122 in response to the reception of the transmit mode signal to place the calling subscriber station in its transmit mode of operation whereby the calling subscriber station 100 may be monitored by central control station 300.

The acknowledgment of the call is accomplished by opening the connection between blade *b* and contact *k*1 of switch TR2 thereby interrupting the current path to ground for tape deck motor 114 and stopping operation thereof.

When actuator RMSA is depressed, switching circuit RMS is actuated to supply the positive potential on positive bus 326 to coil MRC through contact *k*2 and blade *b* of switch RMS1 to energize relay MR. The 690 Hz. receive mode signal from encoder generator 330 is communicated to the calling subscriber station 100 through blade *b* and contact k2 of switch RMS2, contact *k*2 and blade *b* of switch MR1, transformer T5, telephone line 304 and public telephone system 10.

The receive mode signal is received at the calling subscriber station 100 on telephone line 14 and supplied to decoder 118 through hybrid bridge 134, as previously described. Relay RR is energized by receive circuit 120 in response to the reception of the receive mode signal to place the calling subscriber station 100 in its receive mode of operation. In the receive mode of operation, the calling subscriber station 100 is adapted to receive and audibly reproduce messages from the operator at central control station 300.

Acknowledgement of the call is accomplished by opening the connection between blade *b* and contact *k*1 of switch RR2 thereby interrupting the current path to ground for tape deck motor 114 and stopping operation thereof.

When the calling subscriber station 100 is placed in its transmit mode of operation, relay RR is deenergized and relay TR is latched in its energized state by the completion of a current path from negative bus 112 through contact *k*1 and blade *b* of switch RR1 and blade *b* and contact *k*2 of switch TR1 through coil TRC. When relay TR is energized the completed current path through coil AIRC to ground is momentarily interrupted due to the opening of blade *b* and contact *k*1 of switch TR3; however, the circuit for coil AIRC is completed when the calling subscriber station 100 is in its transmit mode of operation through contact *k*2 and blade *b* of switch TR2 and contact *k*1 and blade *b* of switch RR2 to ground. Relay AIR will not drop out during the momentary interruption of the current path for coil AIR3 due to the shunt capacitor C1 across coil AIRC which supplies holding current for coil AIRC.

When the calling subscriber station 100 is in its transmit mode of operation the operator at central control station 300 can monitor the calling subscriber station 100 by listening to sounds picked up by transducer 140 operating in its microphonic condition. Sounds picked up from transducer 140 are supplied to telephone line 104 for communication to central control station 300 through coupling circuit 146, contact *k*2 and blade *b* of switch TR4, amplifier 116, blade b and contact *k*1 of switch RR3, input-output lead 138 and hybrid bridge 134. Thus, the operator at central control station 300 may listen to events occuring at the calling subscriber station 100, and a determination may be made as to the validity of the alarm and the action necessary to eliminate the condition existing at the calling subscriber station 100. A plurality of microphones may be disposed at various locations in and around the subscriber station such that the operator may listen to sounds representing the overall circumstances existing at subscriber stations 100.

Actuator TMSA is actuated for only a short time in that relay TR is latched in its energized state after initial energization. Furthermore, relay MR must be energized in order to prevent the transmit mode signal generated by encoder generator 332 from reaching speaker 334 and in order that central control station 300 can transmit the transmit mode signal to the calling subscriber station 100. However, relay MR must be deenergized shortly thereafter in order that sounds picked up by microphonic action of transducer 140 at the calling subscriber station 100 may be audibly reproduced by speaker 334 through amplifier 328 in the same manner as previously described with respect to the audible reproduction of the message from the tape deck. Thus, switching circuit TMS is returned to its deactuated state after a short predetermined time to deenergize relay MR by placing blade *b* of switch TMS1 in contact with unconnected contact *k*1 to interrupt the circuit through coil MRC.

When the calling subscriber station 100 is placed in its receive mode of operation, relay TR is deenergized and relay RR is latched in its energized state by the completion of a current path from negative bus 112 through contact *k*1 and blade *b* of switch TR1 and blade *b* and contact *k*2 of switch RR1 through coil RRC.

Actuator RMSA is actuated for only a short time in order to permit the 690 Hz. receive mode signal to be received by the calling subscriber station 100 to latch relay RR in its energized state. It is necessary during the transmission of the receive mode signal that relay MR be energized to prevent the receive mode signal from reaching speaker 334 and to assure the application of the receive mode signal to transformer T5; however, once sufficient time has elapsed to permit the receive mode signal to be received by the calling subscriber station 100, relay MR is deenergized to connect blade *b* of switch MR2 with contact *k*1 to permit use of handset HSA.

After the calling subscriber station 100 has been placed in its receive mode of operation, the operator may pick up handset HSA and voice any message desired to be communicated to the calling subscriber station 100. Switching circuit HS is controlled by the physical position of handset HSA; and, when handset HSA is picked up by the operator, switching circuit HS is actuated such that the circuits to amplifier 328 and speaker 334 are opened by switches HS1 and HS2. The voiced message from the operator is transmitted through telephone apparatus 302, telephone line 304 and public telephone system 10 to the calling subscriber station 100.

At the calling subscriber station 100, the messages from central control station 300 are received on telephone line 104 and supplied to transducer 140 for audible reproduction through hybrid bridge 134, input-output lead 138, contact *k*2 and blade *b* of switch RR4, contact *K*1 and blade *b* of switch TR4, amplifier 116, and blade *b* and contact *k*2 of switch TR3.

While initial acknowledgment of the call from a subscriber station 100 may be accomplished by depressing either actuator TMSA or actuator RMSA to place the calling subscriber station 100 in either a transmit or receive mode of operation, the initial mode of operation of the calling subscriber station 100 may be changed by depressing the other actuator. For instance, generally the operator at central control station 300 will depress actuator TMSA in response to a call from a subscriber station 100 in that normally the initial determination to be made is the type of alarm condition existing at the calling subscriber station 100. After monitoring the calling subscriber station 100, the operator may wish to transmit a message to the calling subscriber station 100 in which case actuator RMSA is depressed to transmit a transmit mode signal from encoder generator 330 the the calling subscriber station 100 as previously described.

The receive mode signal is operative at the calling subscriber station 100 to energize relay RR and due to the opening of blade *b* and contact *k*1 of switch RR1, the holding current path for relay TR is interrupted thereby deenergizing relay TR. Thus, the calling subscriber station 100 will be changed from its transmit mode of operation to its receive mode of operation. During this transition the current path to ground through coil AIRC, switch TR2 and switch RR2 is momentarily interrupted due to the opening of blade *b* and contact *k*1 of switch RR2. However, this current path is completed through blade *b* and contact *k*1 of switch TR3 once the calling subscriber station 100 is placed in its receive mode of operation. The momentary interruption of the current path to ground through coil AIRC will not permit relay AIR to drop out due to the supply of current from shunt capacitor C1 to coil AIRC.

Similarly, if it is desired to monitor the calling subscriber station 100 when the calling subscriber station is in its receive mode of operation, actuator TMSA is depressed to transmit a transmit mode signal from encoder generator 332 to the calling subscriber station 100 to energize relay TR. The opening of blade *b* and contact *k*1 of switch TR1 interrupts the holding current path for relay RR to deenergize relay RR and place the calling subscriber station 100 in its transmit mode of operation. Capacitor C1 acts to prevent relay AIR from dropping out by supplying current to coil AIRC during this transition in the same manner as previously described.

After the operator at central control station 300 has no further need for communication with the calling subscriber station 100, both actuators TMSA and RMSA are actuated simultaneously such that the transmit and receive mode signals from encoder generators 332 and 330 are transmitted simultaneously to the calling subscriber station 100 in the same manner as previously described. The transmit and receive mode signals are operative to energize both relays RR and TR and no holding current path is available for either relay TR or relay RR through switches TR1 and RR1. Similarly, energization of both relay TR and RR interrupts the current path through coil AIRC to ground through blade *b* and contact *k*1 of switch TR3 and blade *b* and contact *k*1 of switch RR2 thereby permitting capacitor C1 to discharge and thereafter deenergization of relay AIR. With relay AIR deenergized there is no negative potential from source 110 applied to negative bus 112 and the calling subscriber station 100 is returned to its normal passive state.

After the calling subscriber station 100 is returned to its normal passive, state the operator at central control station 300 actuates pushbutton switch 324 which removes the positive operating potential from positive bus 326. Relay HR is thus deenergized and relay AR is connected across telephone line 304 to receive subsequent calls after switch 324 is released. The removal of operating potential from positive bus 326 also returns encoder generators 330 and 332 to their normal inoperative states.

Whether or not the initial call is answered by central control station 300, the calling subscriber station 100 continues in operation to transmit the information on the tape. That is, the tape continues past read heads 130 and 132 to supply the message to telephone line 104. After the 2-second, no-signal period, the 3-second 1KC signal on the second track of the tape holds relay CR in the energized state for 3 seconds which opens telephone line 104 by the opening of contact *k*1 and blade *b* of switch CR1 for a sufficient time to hang up or disconnect the calling subscriber station 100.

Since motor 114 is still operating due to the lack of acknowledgment of receipt of the telephone call, the looped tape will be replayed. That is, the busy signal will again be applied to telephone line 104, the telephone number pulse will again be transmitted to public telephone system 10, the message will be replayed and again after the 2-second, no-signal period the 3-second 1KC signal will hang up the calling subscriber station 100. This recycling operation will continue due to the latched condition of relay AIR until central control station 300 answers and acknowledges the call.

The message portion of the tape at subscriber station 100 may include information as to the type of alarm condition existing is so desired. Similarly, tone transmitters having various frequencies may be utilized in combination with transducer 140 such that after central control station 300 has been called due to the occurrence of a predetermined condition, and the operator at central control station 300 has placed the calling subscriber station 100 in its transmit mode of operation, the condition may be indicated by the tone as picked up by transducer 140 operating in its microphonic mode.

By utilizing a central control station a great variety of conditions may be received at a single location and quick action taken to remedy any problems. Since once the central control station has been called the operator has the option to monitor or speak with the calling subscriber station by generating transmit or receive mode signals, any remedial action taken may be precise, and unnecessary action in response to an accidental or invalid alarm may be avoided.

The use of a central control station also permits the tape deck to operate under the control of the tape deck motor to continuously repeat the busy tone signal, telephone number, message and hangup signal until the central control system acknowledges the call. The acknowledgment may take the form of generating either of the mode signals which operate to deenergize the tape deck motor.

If a call from a subscriber station is not acknowledged by the operator at the central control station prior to the 1KC hangup signal, the calling subscriber station will be disconnected even though the call was answered by the central control station. Accordingly, the 2-second, no-signal period between the message and the hangup signal may be lengthened if more time is needed for the operator to acknowledge the call by depressing actuators TMSA or RMSA. Of course, circuitry can be easily designed to provide automatic generating of acknowledge signals by placing a tone on the telephone line each time relay AR is energized; however, such operation has the disadvantage that is possible for a calling subscriber station to receive an acknowledge signal when the operator is not aware of tee call. Accordingly, system integrity is best served by permitting redialing when an acknowledge signal is not received prior to the hangup signal.

The use of dual track tape permits the separate recording of telephone numbers and messages and avoids the switching and timing circuitry normally necessary to assure that the telephone numbers and messages are properly supplied to a telephone line. That is, detector 126 and relay CR are connected with read head 132 to supply the telephone number to telephone line 104 whenever tape deck motor 114 is energized, and amplifier 116 and hybrid bridge 134 are connected with read head 130 to supply messages to telephone line 104 whenever tape deck motor 114 is energized.

The preferred embodiment has been described above and illustrated utilizing electromechanical relays and switches; however, solid state components may be utilized in place of the relays and switches as is well known.

In as much as the present invention is subject to many variations, modifications and changes in detail, it is intended that all matter described in the foregoing specification or shown in the accompanying drawings shall be interpreted as illustrative and not in a limiting sense.

What I claim is:

1. An automatic emergency communication system of the type utilizing a telephone system to place a telephone call to a central control station from a subscriber station upon the occurrence of a predetermined condition, said central control station including a first telephone line connected with the telephone system, and control signal generating means connected with said first telephone line and supplying control signals for controlling apparatus at said subscriber to said first telephone line to be transmitted to said subscriber station through the telephone system, and said subscriber station including a second telephone line connected with the telephone system, recording means storing information signals corresponding to the telephone number of said central control station, first circuit means connected with said recording means and said second telephone line to supply said information signals to said second telephone line upon the occurrence of the predetermined condition, transducer means, second circuit means connecting said transducer means with said second telephone line, and control means connected with said second circuit means and said second telephone line to receive said control signals from said central control station, said control means being responsive to said control signals for placing said second circuit means in a first arrangement wherein said subscriber station is in a transmit mode of operation such that sounds may be picked up by said transducer and communicated to said central control station and in a second arrangement wherein said subscriber station is in a receive mode of operation such that messages from said central control station may be audibly reproduced by said transducer means.

2. The invention as recited in claim 1 wherein said information signals include signals corresponding to a message, and said recording means includes a tape having a first track and a second track, said information signals corresponding to a message being stored on said first track and said information signals corresponding to the telephone number of said central control station being stored on said second track.

3. The invention as recited in claim 2, wherein said first circuit means includes a read head for picking up said information signals corresponding to a message from said first track of said tape, amplifier means connected with said read head, and transformer means connected with said second telephone line and said amplifier means for supplying said information signals corresponding to a message to said first telephone line.

4. The invention as recited in claim 2 wherein said information signals corresponding to the telephone number of said central control station are stored as tones on said second track of said tape, and said first circuit means includes a read head for picking up said tones from said second track of said tape, detecting means connected with said read head, and first switch means connected with said detecting means and said first telephone line for detecting said tones and opening and closing said second telephone line in accordance with the telephone number of said central control station as represented by said tones.

5. The invention as recited in claim 2 wherein said tape has a start position and an end position, said information signals include a tone signal on said first track of said tape at said start position, and said information signals corresponding to the telephone number of said central control station are disposed between said tone signal and said information signals corresponding to a message.

6. The invention as recited in claim 5 wherein said information signals include a hangup signal on said second track of said tape at said end position whereby said hangup signal operates to disconnect said subscriber station.

7. The invention as recited in claim 6 wherein said tape is looped upon itself such that said information signals are repeated.

8. The invention as recited in claim 7 wherein said mode signals include an acknowledge signal, and said control means is connected with said recording means to interrupt operation of said recording means after an acknowledge signal is received such that said hangup signal disconnects said subscriber station if an acknowledge signal is not received and operation of said recording means repeats the call to said central control station until an acknowledge signal is received.

9. The invention as recited in claim 2 wherein said first circuit means includes a first read head for picking up said information signals corresponding to a message from said first track of said tape, amplifier means connected with said first read head, transformer means connected with said second telephone line and said amplifier means for supplying said information signals corresponding to a message to said second telephone line, a second read head for picking up said information signals corresponding to the telephone number of said central control station from said second track of said tape, and detecting means connected with said second read head and said second telephone line for calling said central control station.

10. The invention as recited in claim 2 wherein the automatic emergency communication system includes a plurality of subscriber stations identical to said subscriber station, and said information signals corresponding to a message include signals identifying the associated subscriber station.

11. The invention as recited in claim 1 wherein said control signals include transmit signals, and said control means includes signal responsive means actuated upon the receiving of said transmit signals at said subscriber station to place said second circuit means in said first arrangement wherein said subscriber station is in said transmit mode of operation and sounds may be detected at said subscriber station and transmitted to said central control station.

12. The invention as recited in claim 11 wherein said second circuit means is connected with said recording means to interrupt operation of said recording means when said transmit signals are received at said subscriber station.

13. The invention as recited in claim 12 wherein said information signals include signals corresponding to a message, said first circuit means includes amplifier means connected with said recording means and said second telephone line for supplying said information signals corresponding to a message to said second telephone line, and said second circuit means includes means connecting said transducer means to said second telephone line through said amplifier means when said subscriber station is in said transmit mode of operation.

14. The invention as recited in claim 1 wherein said control signals include receive signals, and said control means includes signal responsive means actuated upon the receiving of said receive signals at said subscriber station to place said second circuit means in said second arrangement wherein said subscriber station is in said receive mode of operation and messages from said central control station may be received by said subscriber station.

15. The invention as recited in claim 14 wherein said second circuit means is connected with said recording means to interrupt operation of said recording means when said receive signals are received at said subscriber station.

16. The invention as recited in claim 1 wherein said mode signals include transmit signals and receive signals, said control means includes first means responsive to said transmit signals and second means responsive to said receive signals, said second circuit means includes first relay means connected with said first means responsive to said transmit signals, said first relay means having a normally deenergized state and an energized state in response to receiving of said transmit signals, second relay means connected with said second means responsive to said receive signals, said second relay means having a normally deenergized state and an energized state in response to receiving of said receive signals, whereby said subscriber station is in said transmit mode of operation when said first relay means is in said energized state and said second relay means is in said deenergized state corresponding to said first arrangement and said subscriber station is in said receive mode of operation when said first relay means is in said deenergized state and said second relay means is in said energized state corresponding to said second arrangement.

17. The invention as recited in claim 16 wherein said recording means is connected with said first relay means and said second relay means and the operation of said recording means is interrupted by either said first relay means or said second relay means being placed in its energized state.

18. The invention as recited in claim 16 wherein said first circuit means includes amplifier means for supplying said information signals corresponding to a message to said second telephone line, and said first relay means connects said transducer means with said amplifier means when said first relay means is in said energized state such that signals from said transducer means are amplified and supplied to said second telephone line when said subscriber station is in said transmit mode of operation.

19. The invention as recited in claim 18 wherein said amplifier means has an input connected with said second telephone line through said second relay means when said second relay means is in said energized state and an output connected with said transducer means through said second relay means when said second relay means is in said energized state such that signals from said central control station are amplified and supplied to said transducer means when said subscriber station is in said receive mode of operation.

20. The invention as recited in claim 19 wherein said transducer means includes a combination speaker-microphone.

21. The invention as recited in claim 16 wherein said first circuit includes condition responsive means including third relay means having a normally deenergized state and an energized state, said third relay means being latched in said energized state in response to the occurrence of the predetermined condition, said first relay means and said second relay means are connected with said first relay means such that said third relay means is placed in said deenergized state when said first relay means and said second relay means are simultaneously placed in said energized states whereby said third relay means may be returned to said normal deenergized state by simultaneous transmitting of said transmit signals and said receive signals from said central control station.

22. The invention as recited in claim 21 wherein said condition responsive means includes a pair of normally open contacts which are closed in response to the occurrence of the predetermined condition to place said third relay means in said energized state, and said third relay means includes holding means for latching said third relay means in said energized state whereby momentary closing of said contacts is sufficient to initiate calling operation of said subscriber station.

23. The invention as recited in claim 22 wherein said holding means includes a current path through said first and second relay means, said current path being interrupted when said first and second relay means are simultaneously placed in said energized states.

24. The invention as recited in claim 23 wherein said third relay means includes a coil and a holding capacitor shunted across said coil whereby said third relay means remains in said energized state when said current path is interrupted momentarily.

25. The invention as recited in claim 21 wherein said first relay means includes first holding means for latching said first relay means in said energized state, and said second relay means includes second holding means for latching said second relay means in said energized state, said first holding means includes a first current path through said second relay means, and said second holding means includes a second current path through said first relay means whereby said subscriber station may be changed from said transmit mode of operation to said receive mode of operation by interruption of said first current path and from said receive mode of operation to said transmit mode of operation by interruption of said second current path and whereby neither said first or second relay means is latched in said energized state when said first and second relays are simultaneously placed in said energized states.

26. The invention as recited in claim 16 wherein said control means includes resonant reed decoding means for recognizing said transmit signals and said receive signals by frequency.

27. The invention as recited in claim 16 wherein the automatic emergency communication system includes a plurality of subscriber stations identical to said subscriber station.

28. The invention as recited in claim 1 wherein said information signals include signals corresponding to a message, and said central control station includes a speaker, and third circuit means connecting said speaker with said first telephone line whereby said information signals corresponding to a message may be audibly reproduced at said central control station.

29. The invention as recited in claim 28 wherein said central control station includes telephone apparatus and a handset connected with said first telephone line, and said third circuit means includes first switch means actuated by said handset to disconnect said speaker when said handset is in use.

30. The invention as recited in claim 28 wherein said control signal generating means includes a first generator for generating transmit signals having a first frequency and a second generator for generating receive signals having a second frequency, and said control means at said subscriber station includes first frequency responsive means for detecting said first frequency transmit signals and placing said subscriber station in said transmit mode of operation, and second frequency responsive means for detecting said second frequency receive signals and placing said subscriber station in said receive mode of operation.

31. The invention as recited in claim 30 wherein said central control station includes first switch means connected with said first generator and said first telephone line, second switch means connected with said second generator and said first telephone line, transmit actuator means connected with said first switch means to actuate said first switch means and supply said first frequency transmit signals to said first telephone line, and receive actuator means connected with said second switch means to actuate said second switch means and supply said second frequency receive signals to said first telephone line.

32. The invention as recited in claim 31 wherein said central control station includes muting relay means connected with said first telephone line, said first switch means, said second switch means and said speaker, said muting relay means having a normally deenergized state and an energized state in response to actuation of either or both of said first and second switch means whereby said speaker is disconnected when said mode signals are supplied to said first telephone line.

33. The invention as recited in claim 1 wherein said central control station includes answering means connected with said first telephone line for automatically answering calls in response to a ringing signal from the telephone system, said answering means including first relay means for receiving the ringing signal from the telephone system to energize said first relay means in response to the ringing signal.

34. The invention as recited in claim 33 wherein said answering means includes holding relay means connected with said first relay means and said first telephone line, said holding relay means being placed in an energized state by energization of said first relay means to deenergize said first relay means and including latching means to latch said holding relay means in said energized state.